(12) United States Patent
Nakamura et al.

(10) Patent No.: US 6,476,530 B1
(45) Date of Patent: Nov. 5, 2002

(54) STATOR OF ALTERNATOR FOR USE IN AUTOMOTIVE VEHICLE

(75) Inventors: Shigenobu Nakamura, Anjo (JP); Tsutomu Shiga, Nukata-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/547,112

(22) Filed: Apr. 11, 2000

(30) Foreign Application Priority Data

Apr. 12, 1999 (JP) .......................................... 11-103618

(51) Int. Cl.$^7$ ................................................ H02K 3/00
(52) U.S. Cl. ...................................... 310/201; 310/254
(58) Field of Search ............................... 310/201, 179, 310/254; 21/596–598

(56) References Cited

U.S. PATENT DOCUMENTS

| | | | |
|---|---|---|---|
| 5,936,326 A | * 8/1999 | Umeda et al. | 310/179 |
| 5,986,375 A | * 11/1999 | Umeda et al. | 310/180 |
| 5,998,903 A | 12/1999 | Umeda et al. | 310/179 |
| 6,051,906 A | * 4/2000 | Umeda et al. | 310/179 |

FOREIGN PATENT DOCUMENTS

GB 2 202 170 A 9/1988

* cited by examiner

Primary Examiner—Tran Nguyen
(74) Attorney, Agent, or Firm—Oliff & Berridge, PLC (57) ABSTRACT

A stator of an alternator for use in an automobile vehicle is composed of a cylindrical stator core and a stator coil disposed in slots of the stator core. The stator coil is formed by connecting plural U-shaped conductor segments, each segment including a pair of conductor portions and a turning portion connecting the pair of conductor portions. The conductor portions are inserted into the stator slots, and turning portions form a coil end extending to an axial side of the stator core. Only the turning portion of the conductor segment has a round cross-section, while other portions have a flat rectangular cross-section. Alternatively, the stator coil may be formed from a continuous conductor wire which has a round cross-section only at turning portions and a flat rectangular cross-section at other portions. The stator coil is easily curved at the turning portions having a round cross-section without damaging an insulator covering the coil, and the conductor portions having a flat rectangular cross-section improve a space factor in the stator slots, thereby increasing the alternator output.

5 Claims, 8 Drawing Sheets

STATOR OF ALTERNATOR FOR USE IN AUTOMOTIVE VEHICLE

CROSS-REFERENCE TO RELATED APPLICATION

This application is based upon and claims benefit of priority of Japanese Patent Application No. Hei-11-103618 filed on Apr. 1999, the content of which is incorporated herein by reference.

BACKGROUND OF THE INVENTION

1. Field of the Invention

The present invention relates to a stator of an alternator for use in an automotive vehicle.

2. Description of Related Art

It is generally known to improve a space factor of a stator coil and thereby to decrease resistance of the coil and to increase an output of an alternator. It is important to increase the alternator output without increasing the alternator size, because electrical load in recent automobiles is becoming high. An example of an alternator in which the space factor is improved by inserting a coil having a rectangular cross-section into the stator slots is disclosed in JP-A-63-194543 (GB counterpart: GB-2,202,170A). Since the shape of the stator slot is substantially rectangular, the space factor becomes high when a coil having a rectangular cross-section is inserted therein, decreasing spaces formed between the slot and the coil.

It is also known to use plural conductor segments connected to one another to form a stator coil. For example, WO98/54823 (US counter part: U.S. Pat. No. 5,998,903) shows an stator in which U-shaped conductor segments having a rectangular cross-section are inserted into the stator slots from one end thereof, and open ends of the conductor segments are connected to one another at the other end of the stator slots. The stator coil is more easily formed by arranging the plural conductor segments than by winding a continuous wire.

However, in the stator disclosed in JP-A-63-194543, coil ends of the stator coil become bulky, and therefore the coil ends of each coil corresponding to respective phases accommodated in the same slot interfere with one another, because the rectangular cross-section of each coil changes to a round cross-section immediately after the coil comes out of the slot. The outer diameter of the coil ends become large, and accordingly a large frame for supporting the stator is required. This makes it difficult to reduce the size of the alternator. On the other hand, in the stator disclosed in WO98/54823, a conductor having the rectangular cross-section and a predetermined length has to be bent, or turned, at its middle portion to form the U-shaped conductor segment. When the rectangular conductor is bent, a large stress is imposed on the bending portion, thereby damaging an insulating film covering the conductor. This is detrimental to durability of the stator.

SUMMARY OF THE INVENTION

The present invention has been made in view of the above-mentioned problem, and an object of the present invention is to provide an improved stator of an alternator which has a high output in a compact size and high durability.

An alternator for use in an automotive vehicle is composed of a stator fixedly supported by a frame and a rotor rotatably supported in the stator. The stator includes a cylinder-shaped stator core having plural slots formed along the inner surface thereof and a stator coil disposed in the slots. The stator coil is formed by connecting plural U-shaped conductor segments, each segment having a pair of conductor portions, a turning portion connecting the pair of conductor portions and a pair of open end portions. The conductor portions are accommodated in the slots, the turning portions form a first coil end extending to one axial side of the stator core, and the end portions are connected to one another forming a second coil end extending to another axial side of the stator core.

Only the turning portion of each U-shaped conductor segment has a substantially round cross-section, such as a circular or oval cross-section, while all other portions have a flat rectangular cross-section. The U-shaped conductor segment may be made from a conductor bar having a uniform flat rectangular cross-section by deforming only the turning portion into a round cross-section. At least a part of the turning portion where a turning curvature is high is deformed into the round cross-section to prevent excessive stress from being imposed on the turning portion when the segment is bent into the U-shape.

Plural conductor portions may be inserted into each stator slot, and two kinds of U-shaped conductor segment, one being bent with a high curvature and the other with a low curvature, may be used. In this case, only the turning portion bent with a high curvature may be deformed into the round cross-section.

Alternatively, the stator coil is formed from a continuous conductor wire having plural conductor portions and turning portions connecting two neighboring conductor portions. In this case, too, only the cross-section of the turning portions is made round, while keeping other sections of the conductor wire including the conductor portions in the flat rectangular cross-section. The conductor portions are accommodated in the stator slots, and the turning portions extend to both axial sides of the stator core, forming coil ends at both sides.

According to the present invention, only the turning portions of the stator coil have a substantially round cross-section, while other portions including the conductor portion have a rectangular cross-section. Therefore, the stator coil is easily curved at the turning portions without damaging an insulator film covering the coil, and a space factor in the slot is increased. As a result, a compact alternator having a high output and a high durability is realized.

Other objects and features of the present invention will become more readily apparent from a better understanding of the preferred embodiment described below with reference to the following drawings.

DETAILED DESCRIPTION OF THE PREFERRED EMBODIMENT

Figure 1:
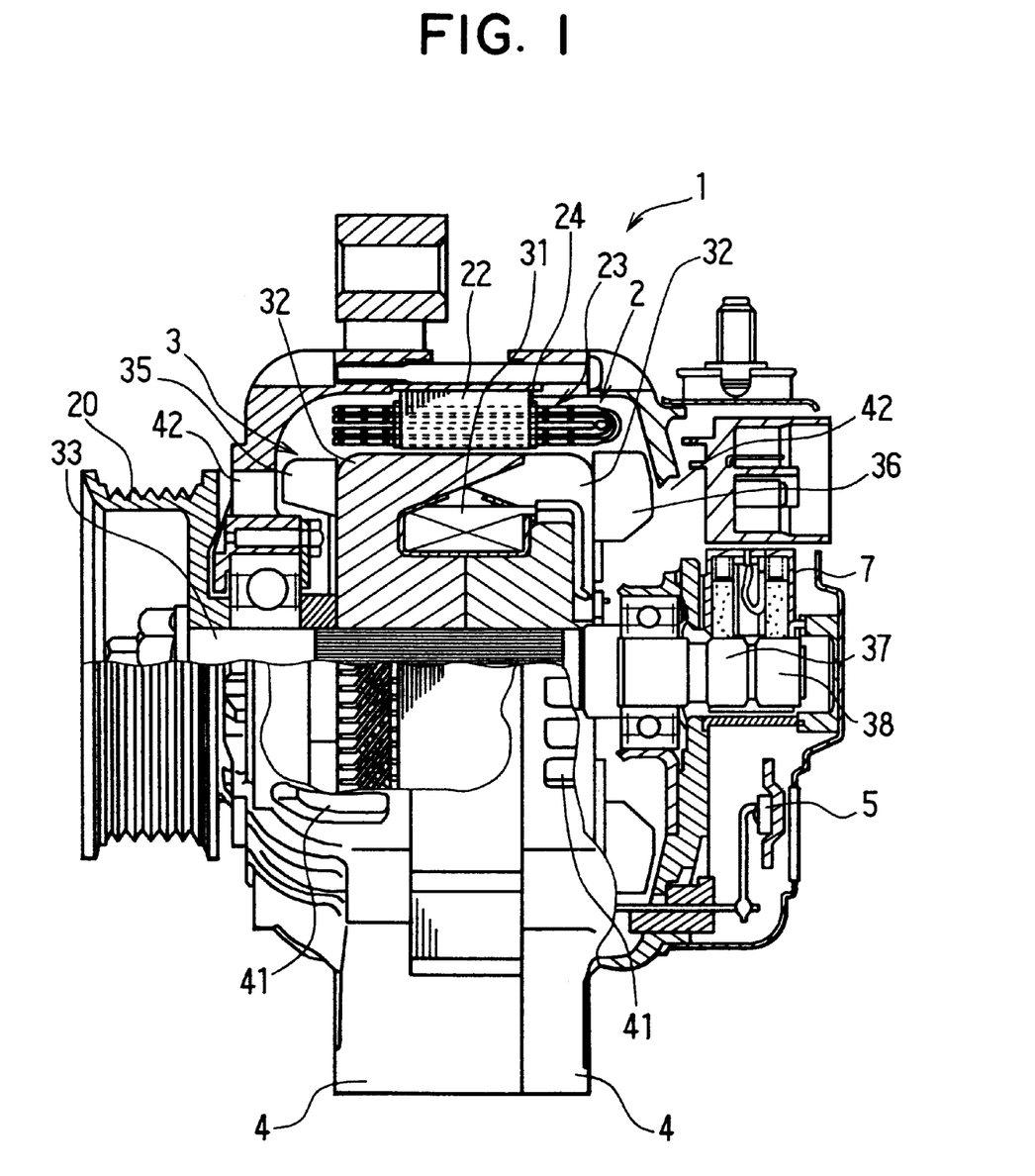
FIG. 1 is a cross-sectional view showing a whole structure of an alternator according to the present invention.

First, referring to FIG. 1, a whole structure of an alternator of the present invention will be described. The alternator 1 is composed of a stator 2 fixedly supported in frames 4, a rotor 3 rotatably supported by the frames inside the stator, a pulley 20 for driving the rotor, and a rear cover including a brush device 7 and a rectifier 5. The stator 2 is composed of a stator core 22, a stator coil 23 having plural conductor segments, and insulators 24 for insulating the conductor segments from the stator core 22.

The rotor 3 is a Lundel-type rotor composed of a shaft 33, a pair of pole cores 32 fixed to the shaft 33, and a field coil 31 wound on and between the pair of pole cores 32. The pair of pole cores 32 consisting of a front and a rear pole core, each having six claws, forms 12 rotor poles with an N-pole and an S-pole alternately arranged with an equal interval therebetween. A cooling fan 35 for sucking air from the front side (pulley side) and for sending the sucked air both in the axial and radial directions is fixed to the front surface of the front pole core 32. Similarly, another cooling fan 36 for sucking air from the rear side and for sending the sucked air in the radial direction is fixed to the rear surface of the rear pole core 32. A pair of slip-rings 37, 38 is disposed on the rear end of the shaft 33, and each end of the field coil 31 is connected to each slip-ring 37, 38. The brush device 7 slidably contacts the pair of slip-rings 37, 38 to supply excitation current to the field coil 31.

The frames 4 consisting of a front and a rear frame fixedly support the stator 2 therein and rotatably support the rotor 3. Each frame 4 has inlet windows 42 through which cooling air is sucked and outlet windows 41 through which the cooling air is exhausted. The outlet windows 41 are located at positions corresponding to coil ends extending from the stator core 22 to both sides thereof.

The rotor 3 is driven by an engine (not shown) through a belt rotating the pulley 20, while the excitation current is supplied to the field coil 31 through the brush device 7 and the slip-rings 37, 38. Magnetic poles having N-poles and S-poles alternately arranged around the rotor 3 are formed, and thereby three-phase alternating current is generated in the stator coil 23. The three-phase alternating current is rectified into a direct current by the rectifier 5.

Figure 2:
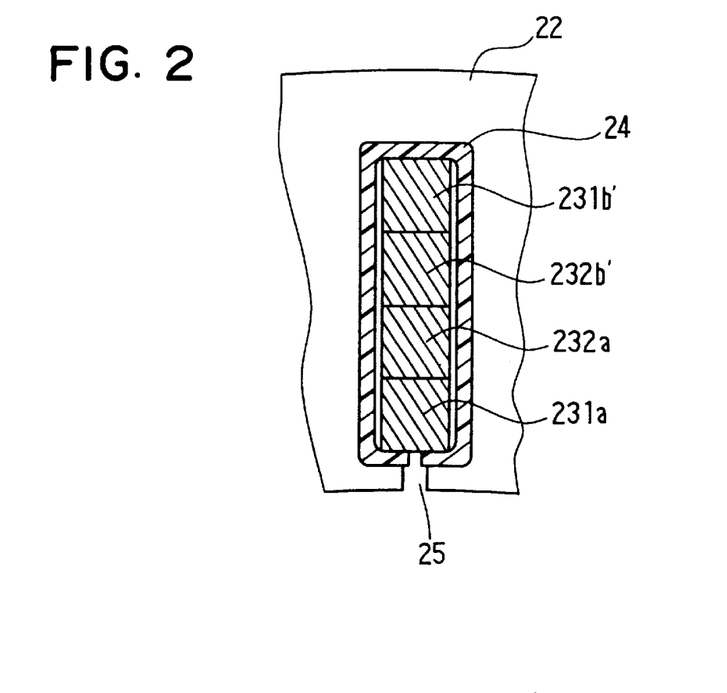
FIG. 2 is a partial cross-sectional view showing a stator slot in which conductors are inserted.

Referring to FIGS. 2, 3, 4 and 5, details of the stator 2 will be described. The stator 2 has a plurality of slots 25 formed along the inner surface thereof. As shown in FIG. 2, each slot 25 accommodates therein four conductors, an inner most conductor 231a, a second inner conductor 232a, a second outer conductor 232b' and an outer most conductor 231b', each disposed in this order from the inside to the outside of the stator 2.

Figure 3:
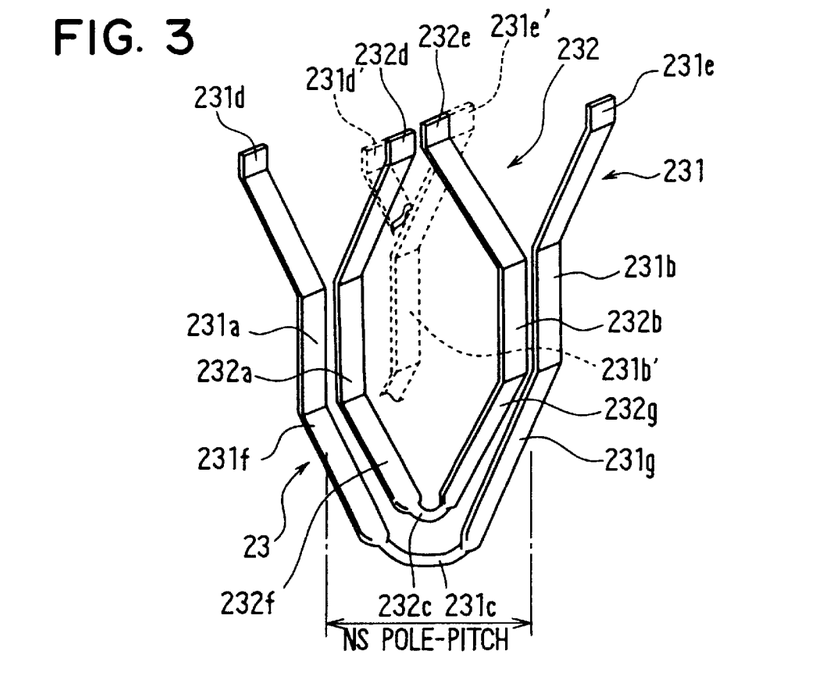
FIG. 3 is a perspective view showing a first and a second conductor segment formed according to the present invention.
Figure 4:
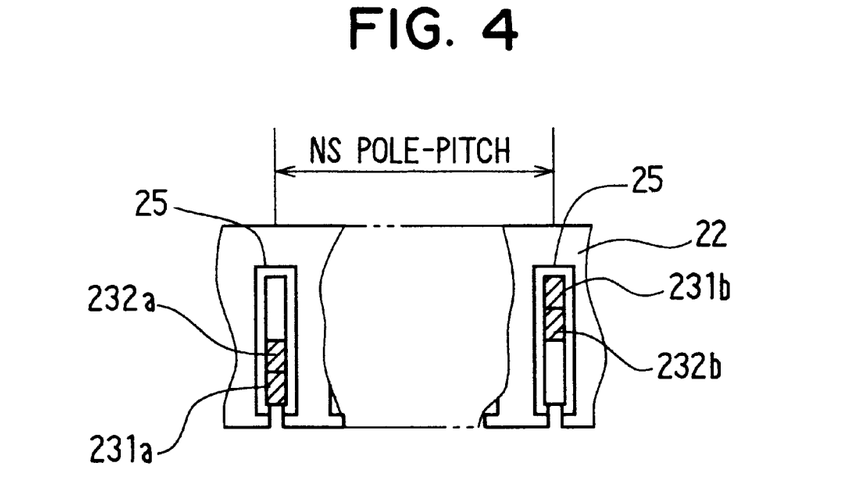
FIG. 4 is a partial cross-sectional view showing two stator slots located one pole-pitch apart from each other.
Figure 5:
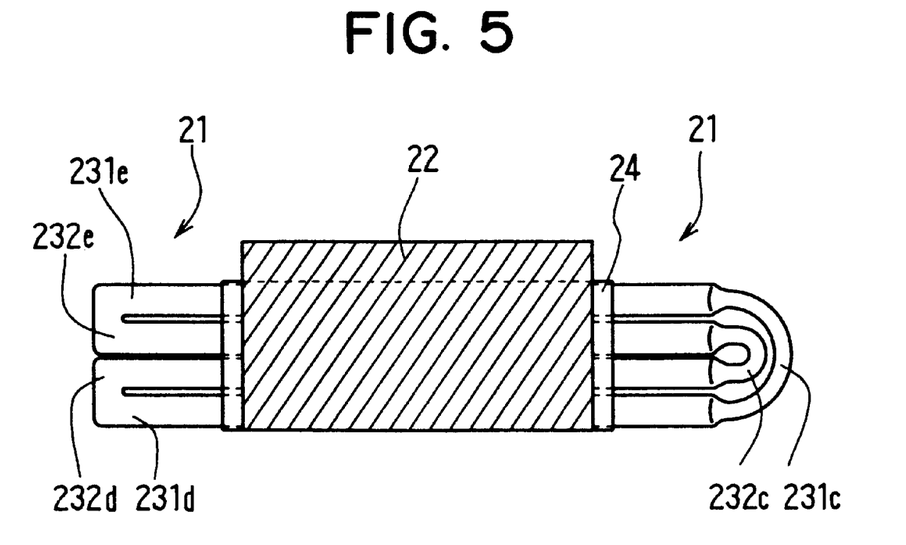
FIG. 5 is a partial cross-sectional view showing a stator core and a stator coil disposed in a slot of the stator core.

FIG. 4 shows a pair of stator slots 25, one located one pole pitch (a pole pitch between an N-pole and an S-pole) apart from the other. A first conductor segment 231 and a second conductor segment 232 (shown in FIG. 3) constituting a pair of conductor segments are disposed in the pair of slots as shown in FIG. 4. The first conductor segment 231 provides the inner most conductor 231a in one slot and the outer most conductor 231b in the other slot. Similarly, the second conductor segment 232 provides the second inner conductor 232a in one slot and the second outer conductor 232b in the other slot. The conductors 231a and 231b are connected to each other at first ends thereof through a turning portion 231c before they are inserted into the slots, while they are connected to other conductor segments at the second ends thereof after they are inserted into the slots. The conductors 232a and 232b are connected to each other at the first ends thereof through a turning portion 232c before they are inserted into the slots, while they are connected to other conductor segments at the second ends thereof after they are inserted into the slots. The turning portion 232c is located inside the turning portion 231c, so that the turning portion 232c is enclosed by the turning portion 231c. Other pairs of the first and second conductor segments are similarly disposed in the stator slots and similarly connected. Thus, the first coil end is formed as shown in the right side of FIG. 5. The first coil end is cooled by cooling air sent from the cooling fan 36.

The second inner conductor 232a is connected to an inner most conductor 231a', which is disposed in another slot located one pole pitch apart from the slot in which the second inner conductor 232a is disposed, at the second end of the conductors by welding or the like. Similarly, an outer most conductor 231b' is connected to the second outer conductor 232b at the second end thereof. The connecting portion of the conductors 232a and 231a', is located offset from the connecting portion of the conductors 231b' and 232b, and the former connecting portion forms an inner connecting portion and the latter an outer connecting portion. All other conductors are similarly connected, forming a second coil end as shown in the left side in FIG. 5. The second coil end is cooled by cooling air sent from the cooling fan 35.

Referring to FIG. 3, the first and second conductor segments will be described in detail. The first conductor segment 231 is composed of: a straight portion corresponding to the inner most conductor 231a; another straight portion corresponding to the outer most conductor 231b; a pair of first slanted portions 231f and 231g; a turning portion 231c connecting the first slanted portions; a pair of second slanted portions extending from the straight portions; and a pair of end portions 231d and 231e. Similarly, the second conductor segment 232 is composed of: a straight portion corresponding to the second inner conductor 232a; another straight portion corresponding to the second outer conductor 232b; a pair of first slanted portions 232f and 232g; a turning portion 232c connecting the first slanted portions; a pair of second slanted portions extending from the straight portions;

and a pair of end portions 232d and 232e. All other conductor segments are similarly formed. The end portion 232d of the second conductor segment 232 is connected to the end portion 231d' of another first conductor segment by welding, ultrasonic welding, arc welding, soldering or the like, thus forming the inner connecting portion at the second end of the stator core 22. Similarly, the end portion 232e of the second conductor segment 232 is connected to the end portion 231e' of another first conductor segment by welding, ultrasonic welding, arc welding, soldering or the like, thus forming the outer connecting portion at the second end of the stator core 22. Those connecting portions are insulated from one another and firmly held by coating an insulating material.

As shown in FIG. 3, both of the first conductor segment 231 and the second conductor segment 232 are formed from a conductor bar having a flat rectangular cross-section, and only the turning portions 231c and 232c are deformed into a round cross-section. The rectangular cross-section is deformed into the round cross-section, so that the cross-sectional area of the round cross-section becomes substantially equal to that of the rectangular cross-section.

Since the conductors disposed in the stator slots 25 have the rectangular cross-section, the space factor in the slot is high. Therefore, electric resistance of the stator coil 23 as a whole can be made low and the alternator output can be increased. Since the stator coil 23 is formed from plural conductor segments by connecting them in a wave-connection, interference among phases is avoided, and accordingly it is not necessary to enlarge the outer diameter of the coil ends to avoid the interference. Therefore, the alternator as a whole can be made compact. Since the turning portion 231c, 232c of the conductor segment is made round, stress imposed on the turning portion when the conductor segment is bent is alleviated. Accordingly, the insulation layer covering the turning portion is not damaged by the bending stress. If the cross-section of the turning portion were rectangular as in the conventional stator, the insulation layer would be damaged by the bending stress.

The amount of the bending stress imposed on the turning portion depends on its curvature. Since the curvature of the turning portion 232c of the second conductor segment 232 is larger than that of the turning portion 231c of the first conductor segment 231, it may be possible to make only the turning portion 232c round, while keeping the turning portion 231c rectangular. In this particular embodiment shown in FIG. 3, a whole length of the connecting portion 231c, 232c is made to have the round cross-section. However, the length of the turning portion having the round cross-section may be varied according to strength of the insulation layer. If the strength of the insulation layer is high, the length of the turning portion having the round cross-section can be made shorter, as long as that length covers at least a part of the turning portion having the largest curvature. It is preferable to make the round cross-section symmetrically with respect to the part having the largest curvature.

Figure 6:
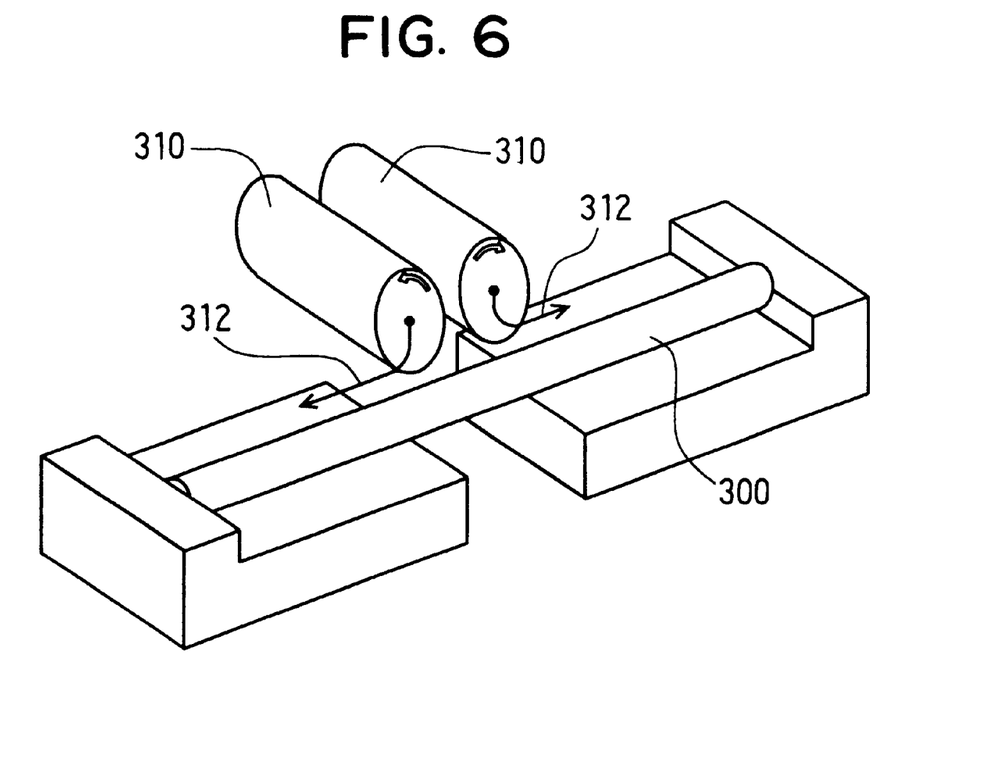
FIG. 6 is a perspective view showing a method of forming a rectangular cross-sectional portion from a round conductor wire.
Figure 7:
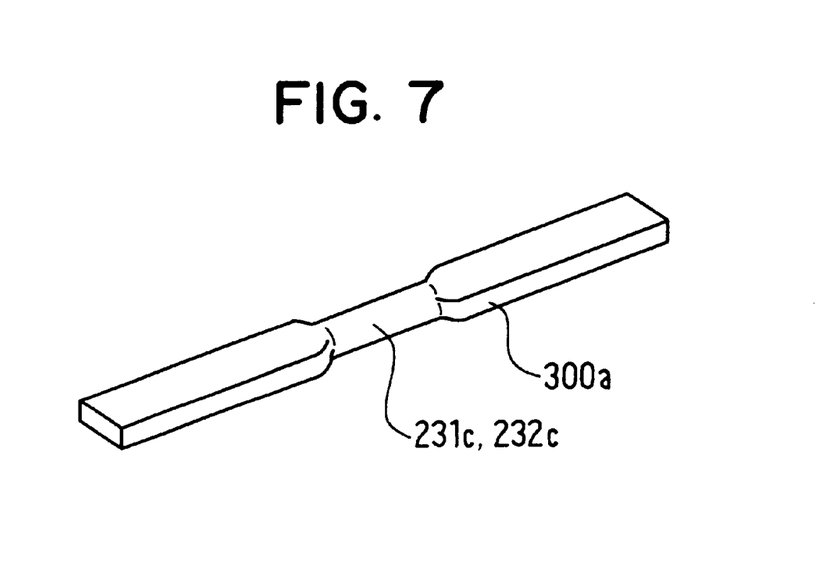
FIG. 7 is a perspective view showing a conductor bar having a rectangular cross-section at both sides and a round cross-section at its middle portion.

In reference to FIGS. 6 and 7, a process of making the rectangular cross-section from a conductor bar having a round cross-section will be explained. A round conductor bar 300 having a predetermined length is cut out from a round conductor coil having a cross-section which is equal to the cross-section of the turning portion. Since the length of the first conductor segment is longer than that of the second conductor segment, it is necessary to prepare two kinds of conductor bars 300 having the respective length. The conductor bar 300 is held on a jig, and a pair of rollers 310 are pushed against the conductor bar 300 to press-down the both sides of the conductor bar into a square cross-section, keeping only the middle portion round. The pair of the rollers 310 respectively moves to the direction shown with arrows 312 in FIG. 6, while the rollers being rotated.

By deforming the round conductor bar 300 as described above, a conductor segment bar 300a shown in FIG. 7 is formed. The segment bar 300a includes a middle portion having a round cross-section which corresponds to the turning portion 231c, 232c. The segment bar 300a is first bent at the turning portion with a predetermined curvature, and then the slanted portions are formed. The end portions 231e, 231d, etc. are formed after the conductor segment is inserted into the stator slot 25.

Figure 8:
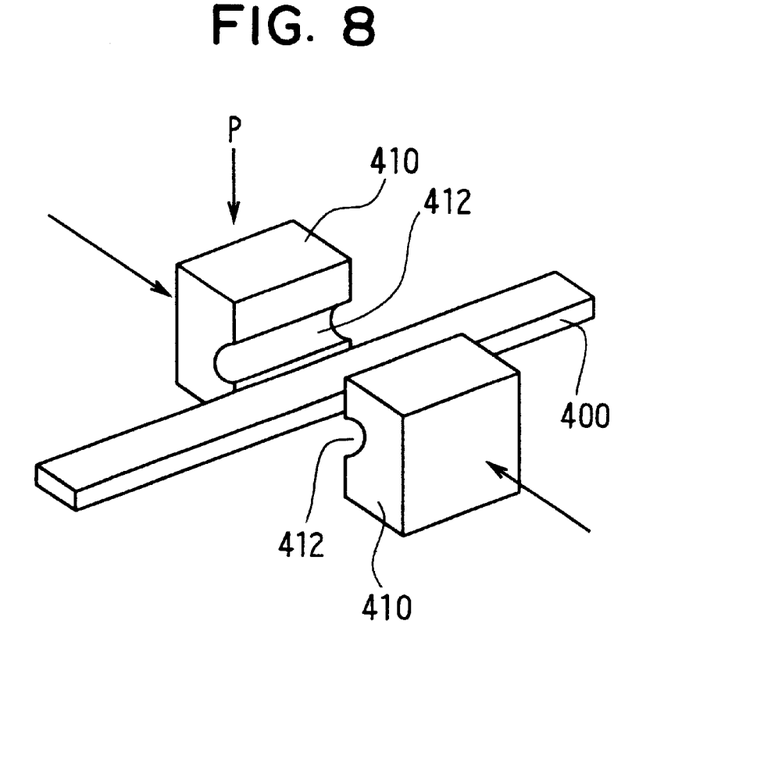
FIG. 8 is a perspective view showing a method of forming a round cross-sectional portion from a conductor wire having a rectangular cross-section.
Figure 9:
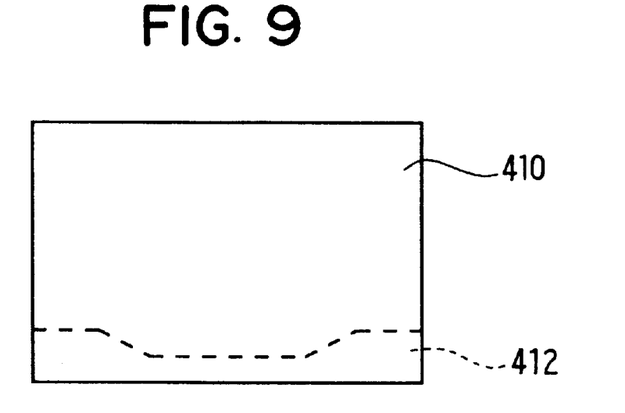
FIG. 9 is a plan view showing a jig used in the method shown in FIG. 8, viewed from the direction of P in FIG. 8.

Alternatively, the conductor segment may be made from a conductor bar having a rectangular cross-section, as shown in FIGS. 8 and 9. A rectangular conductor bar 400 is cut out into a predetermined length. The middle portion of the conductor bar 400 is deformed into a round cross-section by pressing a pair of jigs 410 against the conductor bar, as shown in FIG. 8. Each jig 412 has a round groove 412 that coincides with the outer diameter of the turning portion 231c, 232c. FIG. 9 shows a plan view of the jig 410, viewed from the direction P shown in FIG. 8. The round groove 412 gradually diminishes toward both sides of the jig 412 to avoid abrupt changes of the cross-sections from the round one to the rectangular one. The same conductor bar 300a shown in FIG. 7 is formed in this process, too.

Figure 10:
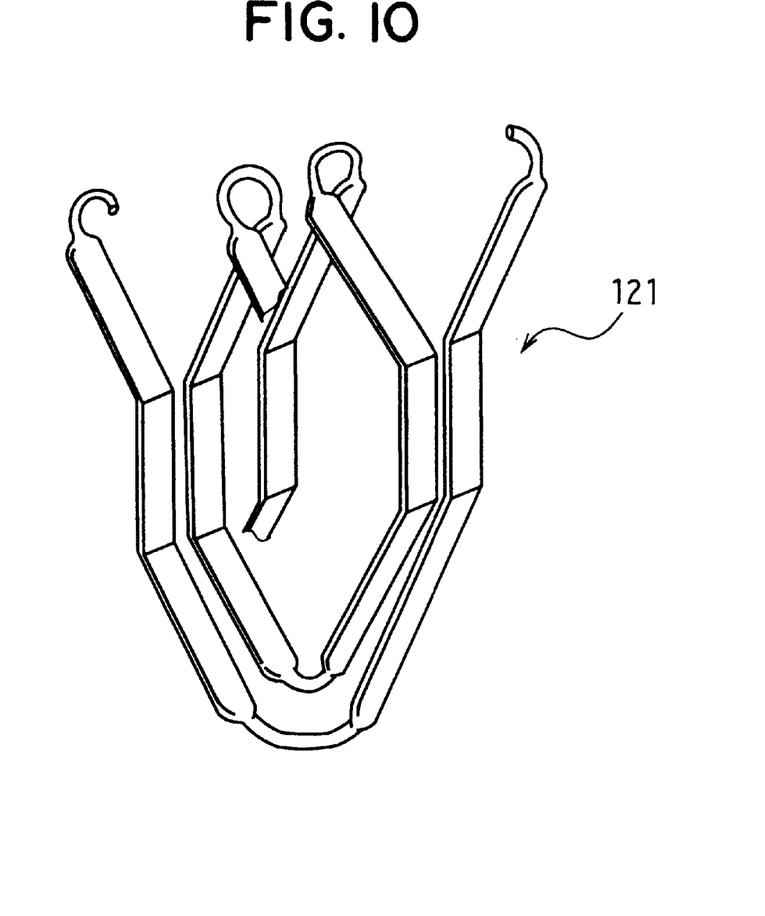
FIG. 10 is a perspective view showing a continuous stator coil as a first modification of the preferred embodiment.
Figure 11:
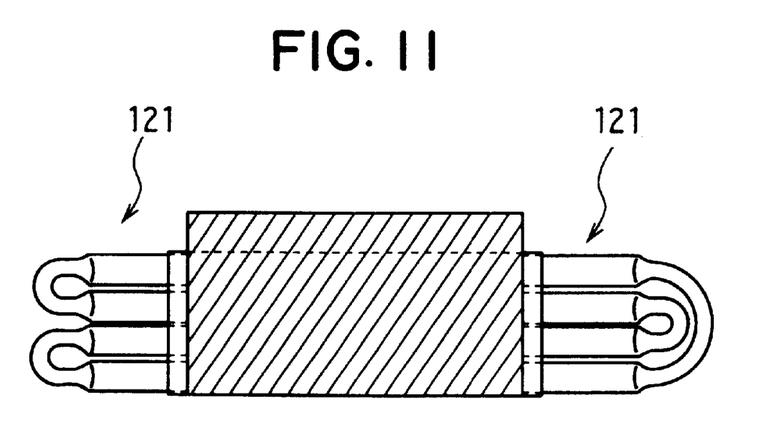
FIG. 11 is a partial cross-sectional view showing a stator slot into which the stator coil shown in FIG. 10 is inserted.
Figure 12:
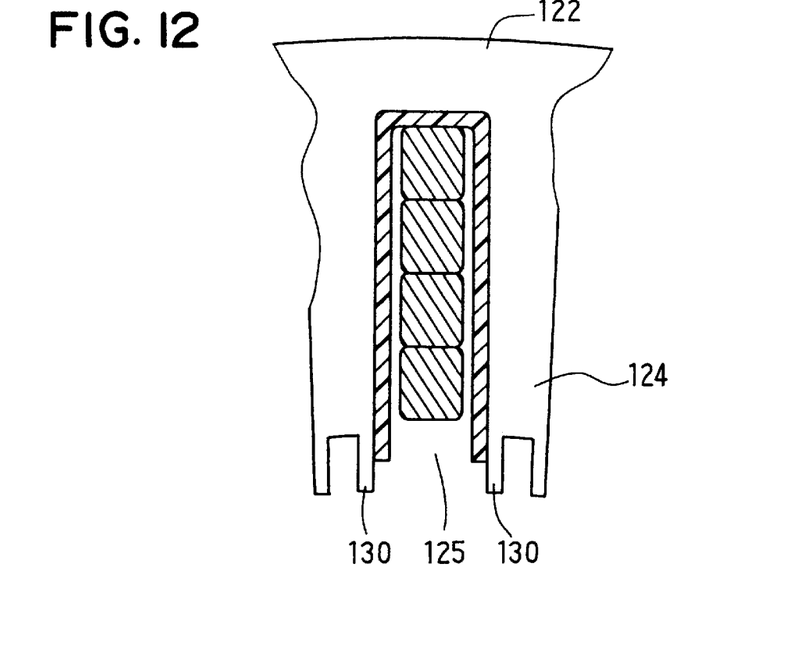
FIG. 12 is another partial cross-sectional view showing a stator slot into which the stator coil shown in FIG. 10 is inserted.

Referring to FIGS. 10, 11 and 12, a first modification of the embodiment described above will be described. In this modification, a stator coil 121 is formed with a continuous conductor, as opposed to the stator coil 23 that is formed by connecting plural conductor segments. The continuous stator coil 121 is formed from a continuous conductor having a rectangular cross-section by deforming only the turning portions into a round cross-section, as shown in FIG. 10. Because it is impossible to insert the continuous coil 121 into the stator slots from its axial end, the coil 121 is inserted from the inside surface of the stator core, as shown in FIG. 12. Therefore, each slot 125 is made open at the inside surface of the stator core, and projections 130 are formed at open end portions 124 of the stator core 122. After the continuous coil 121 is inserted into the slots 125, the projections 130 are bent to close the open ends of the slots 125.

FIG. 11 shows the continuous coil 121 disposed in the stator core 122. Both the first and second coil ends are connected by the turning portions having the round cross-section. Other structures of the stator of this modification are the same as those of the above-described embodiment. Since it is not necessary, in this modification, to connect the end portions of the coil by welding or the like, an insulation material is not required to be coated on the coil ends after the coil is disposed in the stator slots.

Figure 13:
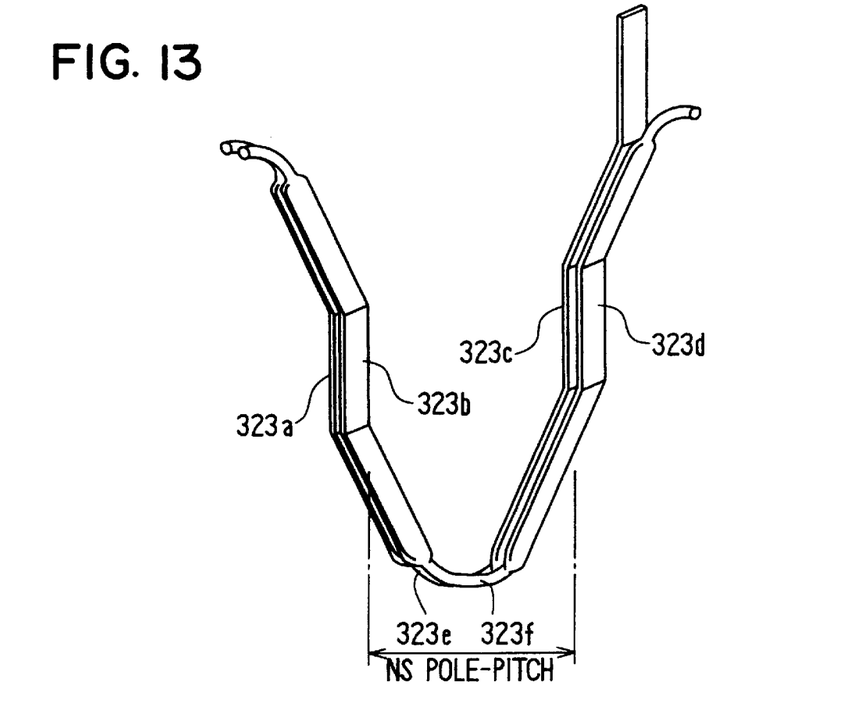
FIG. 13 is a perspective view showing a continuous stator coil as a second modification of the preferred embodiment.
Figure 14:
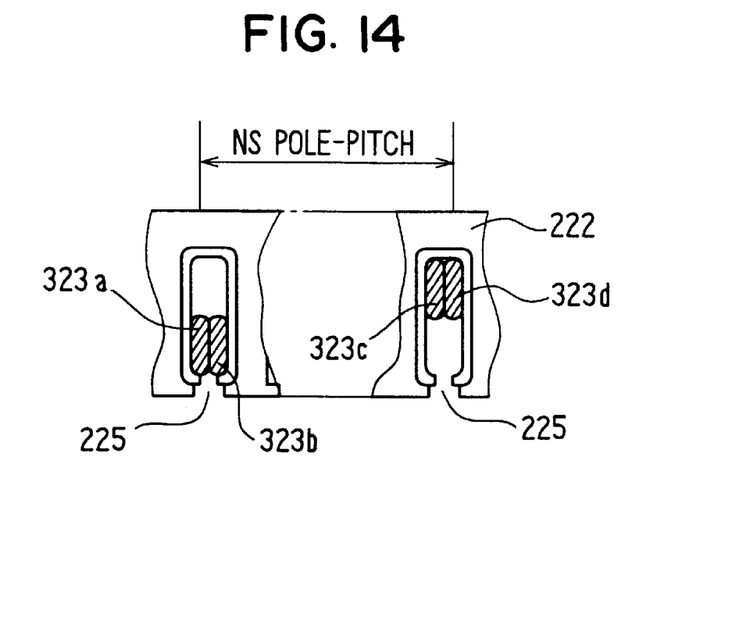
FIG. 14 is a partial cross-sectional view showing two stator slots located one pole-pitch apart from each other, in which the stator coil shown in FIG. 13 is accommodated.
Figure 15:
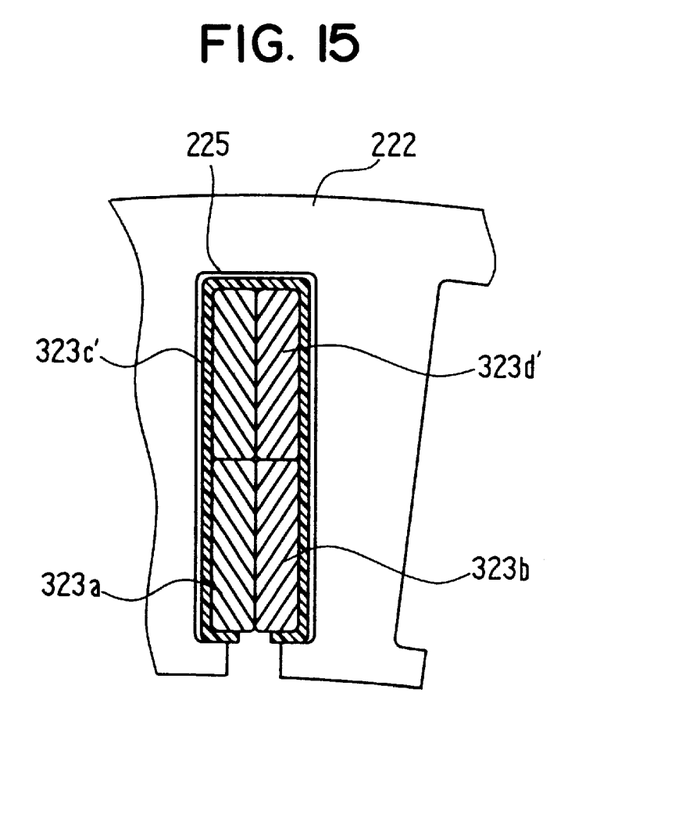
FIG. 15 is a partial cross-sectional view showing a stator slot into which the stator coil shown in FIG. 13 is inserted.

Referring to FIGS. 13, 14 and 15, a second modification will be described. In this modification, too, a continuous coil is used as a stator coil. The continuous coil used in this modification is shown in FIG. 13. A conductor 323a and a conductor 323c are connected by a turning portion 323e, and a conductor 323b and a conductor 323d are connected by a turning portion 323f. Those conductors are inserted into the stator slots 225 and connected in a wave-winding. Only the turning portions 323e, 323f, etc. formed at both coil ends have a round cross-section, while all other portions have a rectangular cross-section. FIG. 14 shows a pair of slots 225, one slot located one pole-pitch (NS pole-pitch) apart from the other slot. The conductors 323a and 323b constituting inner conductors are disposed side by side in one slot 225, while the conductors 323c and 323d constituting outer conductors are disposed side by side in the other slot 225. Other conductors are similarly arranged and disposed in the slots 225. FIG. 15 shows one slot 225 formed in a stator core 222 and four conductors disposed therein. The inner conductors consisting of 323a and 323b are disposed at the inner portion of the slot, while the outer conductors consisting of 323c' and 323d' are disposed at the outer portion of the slot.

Since the continuous coil is used as the stator coil in the second modification, no work for connecting segment coils is required. Since the turning portions 323e, 323f, etc. have the round cross-section, the continuous coil can be easily curved at the turning portions without imposing excessive stress thereon.

Though the cross-section of the turning portion is made round in the embodiment described above, it is not limited to the round shape, but it may be modified to various shapes. For example, the cross-section may be an oval or a square having rounded corners, as long as the flatness degree of the cross-section is smaller than that of the flat rectangular-shape. Though the conductor wire previously coated with an insulator is used to form the stator coil, it is also possible to use an uncoated wire and to coat the uncoated wire with an insulating material after the stator coil is formed.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A stator of an alternator having a rotor rotating in the stator, the stator comprising:

a cylindrical stator core having a plurality of slots formed along an inner bore of the stator core; and a stator coil formed by connecting a plurality of U-shaped conductor segments, each U-shaped conductor segment comprising: a pair of straight conductor portions; a pair of first slanted portions each connected to one end of each straight conductor portion; a turning portion connecting the pair of first slanted portions; and a pair of second slanted portions each connected to the other end of each straight conductor portion, wherein:

the straight conductor portions are accommodated in the slots, the first slanted portions and the turning portions extend to one side of the slots forming a first coil end, and the second slanted portions extend to the other side of the slots and are connected to one another forming a second coil end;

the turning portion of each U-shaped conductor segment has a substantially round cross-section, and the conductor portions and the slanted portions of each U-shaped conductor segment have a rectangular cross-section thereby providing a larger space between neighboring turning portions than between neighboring slanted portions; and all the portions of each U-shaped conductor segment have a same cross-sectional area.

2. The stator of an alternator as in claim 1, wherein:

a plurality of the straight conductor portions of the U-shaped conductor segments are accommodated in each slot.

3. The stator of an alternator as in claim 1, wherein:

the substantially round cross-section covers at least a part of the turning portion where a turning curvature is the largest.

4. A stator of an alternator having a rotor rotating in the stator, the stator comprising:

a cylindrical stator core having a plurality of slots formed along an inner bore of the stator core; and a stator coil formed by connecting a plurality of U-shaped conductor segments, each U-shaped conductor segment comprising: a pair of straight conductor portions; a pair of first slanted portions each connected to one end of each straight conductor portion; a turning portion connecting the pair of first slanted portions; and a pair of second slanted portions each connected to the other end of each straight conductor portion, wherein:

the straight conductor portions are accommodated in the slots, the first slanted portions and the turning portions extend to one side of the slots forming a first coil end, and the second slanted portions extend to the other side of the slots and are connected to one another forming a second coil end; the plurality of U-shaped conductor segments comprise a first group of the U-shaped conductor segments each having the turning portion curved with a small curvature and a second group of the U-shaped conductor segments each having the turning portion curved with a large curvature;

the turning portion of the U-shaped conductor segments belonging to the second group has a substantially round cross-section, and the conductor portions and slanted portions of the U-shaped conductor segments belonging to the second group and all portions of the U-shaped conductor segments belonging to the first group have a rectangular cross-section thereby providing a larger space between neighboring turning portions than between neighboring slanted portions; and all the portions of all U-shaped conductor segments have a same cross-sectional area.

5. A stator of an alternator having a rotor rotating in the stator, the stator comprising:

a cylindrical stator core having a plurality of slots formed along an inner bore of the stator core; and a stator coil formed by a continuous conductor wire, the conductor wire including a plurality of conductor portions and turning portions connecting the conductor portions, wherein the conductor portions are accommodated in the slots and the turning portions form coil ends extending to both axial sides of the stator core, each turning portion has a substantially round cross-section, and each conductor portion has a rectangular cross-section, and the continuous conductor wire has a uniform cross-sectional area throughout its entire length, and the stator coil farther includes a plurality of rectangular cross-section portions disposed between each conductor portion and turning portion, each rectangular cross-section portion being coupled to a conductor portion and a turning portion, each rectangular cross-section portion extending away from a conductor portion disposed in a slot, generally in a direction toward another conductor portion disposed in another slot, wherein each rectangular cross-section portion is a slanted portion, and each slanted portion is slanted relative to a conductor portion to which the slanted portion is coupled, and between neighboring turning portions a larger space is provided than between neighboring slanted portions.

* * * * *